Sept. 5, 1933.    V. G. APPLE    1,925,363
BRAKE SHOE
Filed Oct. 29, 1928    3 Sheets-Sheet 2

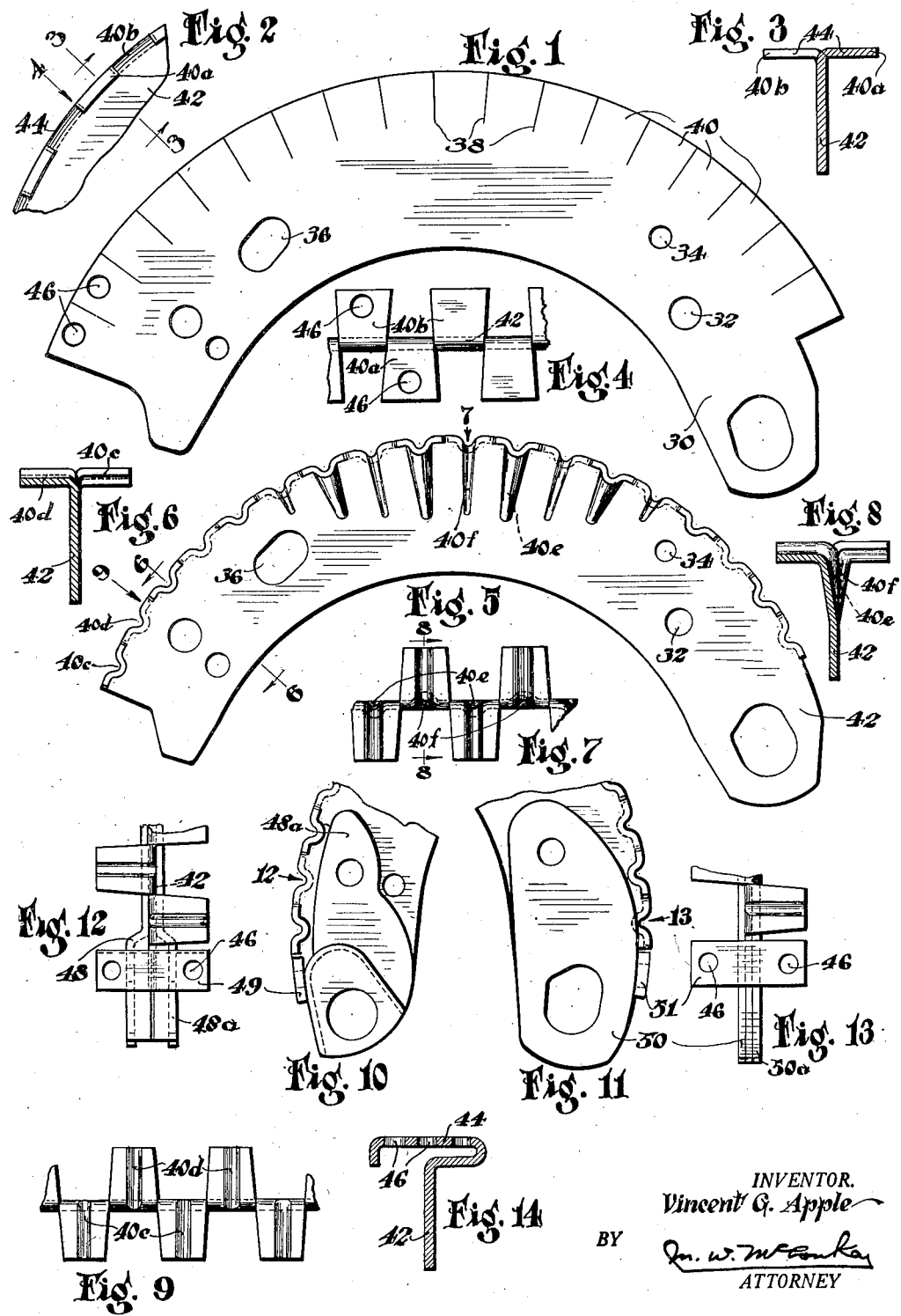

INVENTOR.
Vincent G. Apple
BY
ATTORNEY

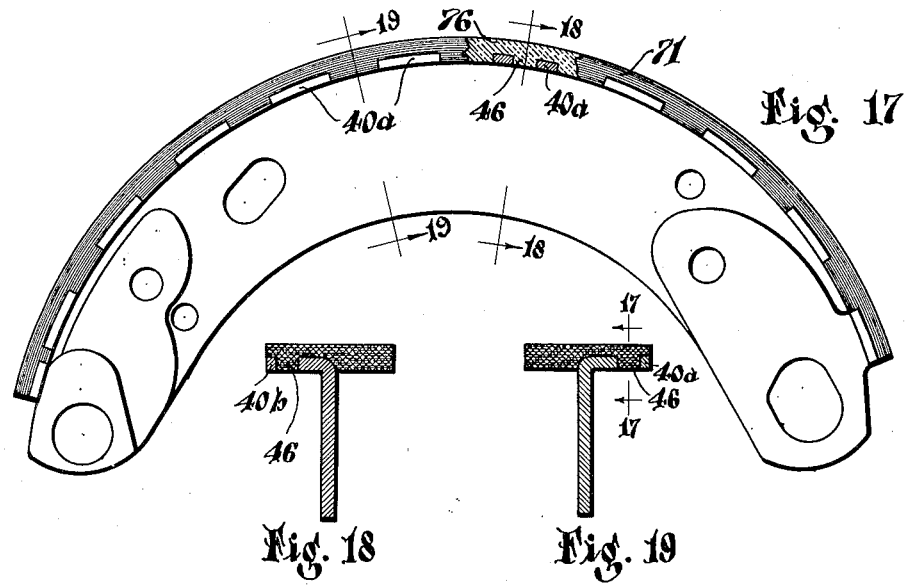
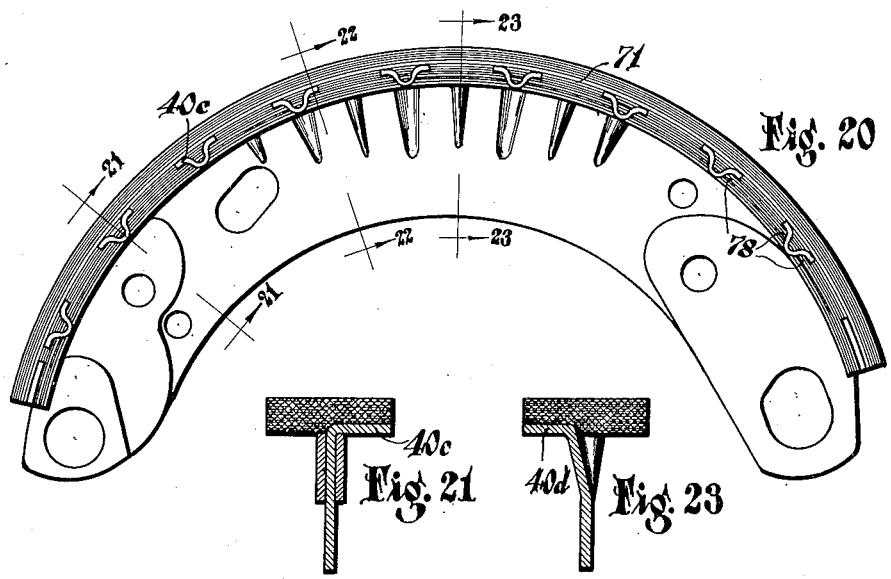
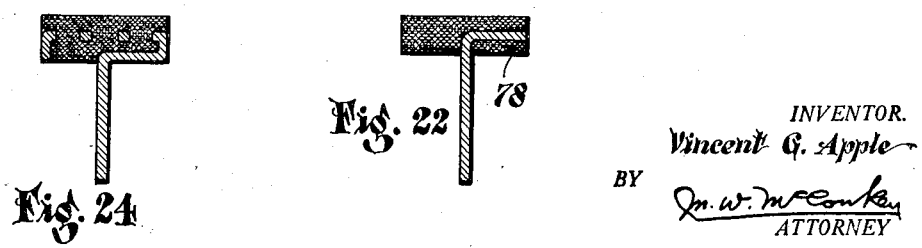

Patented Sept. 5, 1933

1,925,363

UNITED STATES PATENT OFFICE 1,925,363

BRAKE SHOE

Vincent G. Apple, Dayton, Ohio, assignor to Bendix Brake Company, South Bend, Ind., a corporation of Illinois Application October 29, 1928. Serial No. 315,674

8 Claims. (Cl. 188—250)

This invention relates to brake shoes for friction brakes.

The object of this invention is to provide a better brake shoe at less cost; first, by so designing the body or stress resisting element of the shoe that it may be stamped from sheet metal with minimum labor, and then so bending it as to make it particularly adapted to receive and retain the novel friction element; second, by molding the friction element of the shoe through and about portions of the body to bind it securely thereto; and third, by providing a compound from which to compose the molded friction element which has greater strength and wear resisting properties than brake linings used in common practice.

Various features of novelty relate to the novel structure of the shoe itself, to the method of making the shoe, and to the apparatus for carrying out the method.

These and other objects and other meritorious features of the invention are attained by the procedure hereinafter described, the resulting structure being shown in the accompanying drawings, wherein:

Figure 1 shows the outline of the stamping from which the brake shoe is formed.

Figure 2 is a fragmentary side view of the shoe as formed from the stamping in Figure 1.

Figure 3 is a transverse section taken at 3—3 of Figure 2.

Figure 4 is a fragmentary edge view looking in the direction of the arrow 4 in Figure 2.

Figure 5 is a side view of a brake shoe also formed from a stamping of the outline Figure 1, but ribbed so that thinner sheet metal may be used.

Figure 6 is a cross section taken at 6—6 of Figure 5.

Rigure 7 is a partial edge view looking in the direction of the arrow 7 in Figure 5.

Figure 8 is a transverse section taken at 8—8 of Figure 7.

Figure 9 is a partial edge view of Figure 5 looking in the direction of the arrow 9.

Figures 10 and 11 show how the ends of the formed stamping of Figure 5 are reinforced with end plates.

Figure 12 is a partial edge view looking at Figure 10 in the direction of the arrow 12.

Figure 13 is a partial edge view looking at Figure 11 in the direction of the arrow 13.

Figure 14 shows a transverse section through a modified form of brake shoe which may be formed from a sheet metal stamping.

Figure 15:
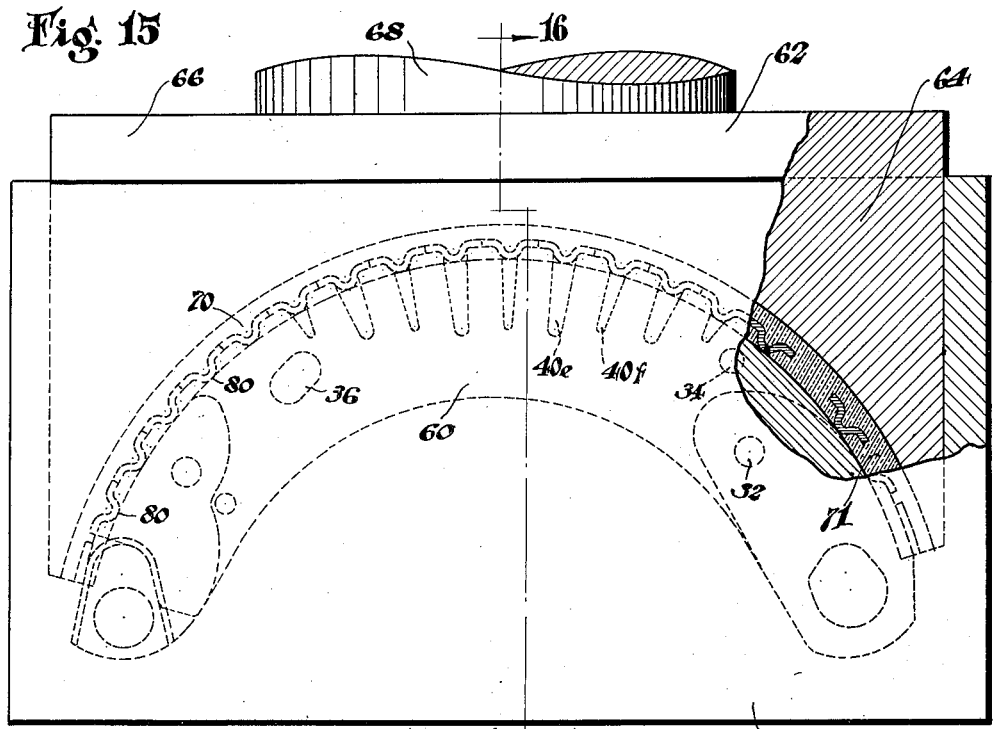
Figure 16:
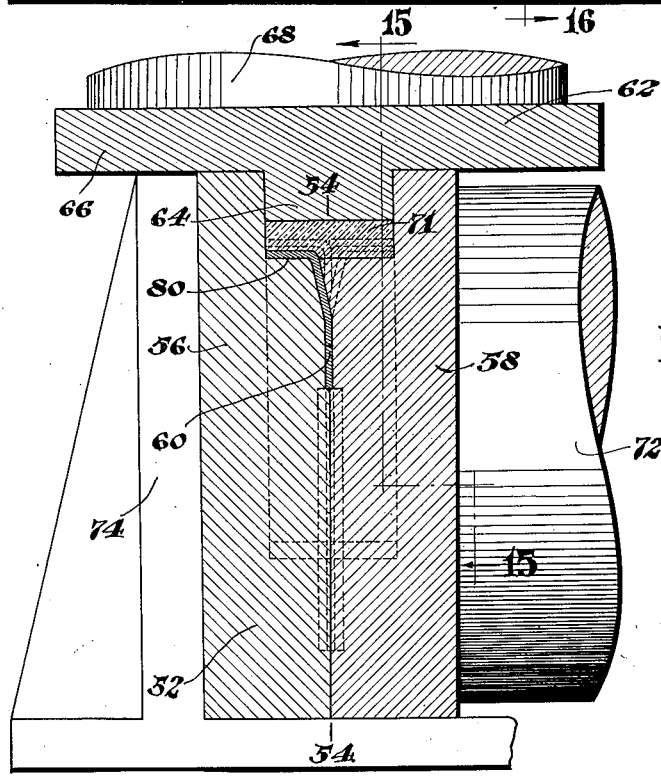

Figure 15 is a side elevation of a mold wherein the brake lining is molded to the shoe, a portion of the mold being broken away to the line 15—15 of Figure 16.

Figure 16 is a transverse section taken at 16—16 of Figure 15.

Figure 17 shows a completed brake shoe as it appears when a stamping Figure 1, bent as in Figures 2, 3 and 4 is employed, a part being broken away as to the line 17—17 of Figure 19.

Figure 18 is a transverse section taken at 18—18 of Figure 17.

Figure 19 is a transverse section taken at 19—19 of Figure 17.

Figure 20 shows a completed brake shoe as it appears when a stamping Figure 1, bent as in Figures 5 to 13 is employed.

Figure 21 is a transverse section taken at 21—21 of Figure 20.

Figure 22 is a transverse section taken at 22—22 of Figure 20.

Figure 23 is a transverse section taken at 23—23 of Figure 20.

Figure 24 is a transverse section showing how the lining appears when applied to a shoe such as is shown in Figure 14.

Similar numerals refer to similar parts throughout the several views.

To carry out my invention I first provide a sheet metal stamping 30 having the necessary holes 32, 34, 36, etc., for attachment to other parts of the brake.

Stamping 30 is then slit at 38, 38, 38 etc., and the divisions or tongues 40, 40, 40, etc., thus formed are bent substantially at right angles to the sheet, the one in one direction as at 40a, 40a etc., and the next oppositely as at 40b, 40b etc., thus forming a shoe of T shaped cross section having a solid web 42 but an intermittently cut away rim 44 formed by the two staggered series of tongues 40. (See Fig. 3). Holes 46 (see Figs. 1 and 4) into which the brake lining may subsequently tie may be added.

With more costly dies an equally effective shoe may be formed of lighter gage sheet stock by cutting a blank to the outline of Figure 1 and pressing the divisions 40, 40 etc., to a more or less channel shape as at 40c and 40d Figs. 5, 6 and 9. At such places as there are no openings such as 32, 34 and 36 etc., in the web 42, the channels may be extended part way across the web as at 40e and 40f to further increase their effectiveness (see Figs. 5, 7 and 8).

After a stamping has been formed as in Figures 2 or 5, a hinge end may be provided by welding a pair of smaller stampings 48 and 48a to one end of web 42. A pair of smaller stampings 50 and 50a may also be welded to the other end of the web for engagement with an anchor. To provide places upon which the ends of the brake lining may rest, two plates 49 and 51 may be welded to plates 48, 48a, 50 and 50a. If preferred, plates 48, 48a, 50, and 50a may be provided with laterally-projecting tongues for this purpose. These plates have the tie holes 46 into which the brake lining may extend.

Figure 14 shows a cross section through a considerably modified form of brake shoe, but which is also made of sheet metal, the stamping being of sufficient width to form the web 42 and rim 44 by drawing it in a die. A plurality of holes 46 extend through the rim and through these the brake lining is subsequently molded.

Having described the manner in which the brake shoe is produced the method of making and attaching the brake lining thereto will be disclosed.

A mold 52 has its body portion divided, as on the line 54—54 (Fig. 16) into two halves, 56 and 58. Each of these halves contains a cavity adapted to receive one-half of the metal brake shoe 60 and fits closely around channels 40e and 40f and into openings 32, 34, 36, etc. The halves are further cut away to receive the mold plunger 62. Plunger 62 comprises a narrow part 64 of substantially the width of the brake shoe rim and a wider part 66 adapted to provide bearing for a ram 68 which forces the plunger downwardly to the position shown. The wider part 66 also limits its downward travel of the part 64, so that space 70 is always left between the end of the plunger and shoe 60 when the mold is closed. A second ram 72 forces the two halves 56 and 58 of the mold body against a member 74 which is part of the molding press. Ram 72 is of sufficient capacity to hold against the pressure tending to force halves 56 and 58 apart when molding is being effected. Part 66 of plunger 62 is secured to the end of ram 68 and half 58 of mold 52 is secured to the end of ram 72.

To apply a brake lining to the shoe, ram 68 is raised bringing with it part 64 of plunger 62. Ram 72 is next withdrawn and with it the half 58 of the mold. A shoe 60 is then placed in the other half 56 of the mold and by operating ram 72 the mold is closed. A predetermined quantity of moldable lining material is now placed in the upper part of the mold cavity and by operation of ram 68 on plunger 62 the lining material is all compressed into the space 70 which conforms to the shape of the completed lining 71. The lining material, which preferably consists essentially of phenolic condensation material or synthetic resin, may then be heated under pressure to cause it to set or harden.

The moldable material for the brake lining preferably contains a fibrous material such as cotton, wood flour, wood wool, mineral wool, asbestos, rayon, etc., and a suitable binder. I prefer to use phenolic condensation material or synthetic resin for the binder. Favorable results have been obtained from a considerable number of compounds of which the following are examples,—

50 to 75 parts fibrous material and 25 to 50 parts synthetic resin.

25 to 50 parts fibrous material, 25 parts cork and 25 to 50 parts synthetic resin.

25 to 50 parts fibrous material, 25 parts graphite and 25 to 50 parts synthetic resin.

Figure 17 shows a completed brake shoe with lining 71 in place, the metal portion having been made as described relative to Figures 2, 3 and 4. The transverse sections Figures 18 and 19 and the broken portion 76 of Figure 17 show how the brake lining rests upon and extends between the intermittent flange divisions 40a and 40b and extends through tie holes 46.

Figure 20 shows a lining 71 applied to a shoe made as described relative to Figures 5 to 9 inclusive. Cross sections Figures 21 and 23 show the lining resting on rim divisions 40c and 40d, while cross section Figure 22 and elevation Figure 20 show how it extends under the ends of the divisions as at 78 to hold it in place.

Figure 24 shows how a lining may be molded through and about a shoe made as described relative to Figure 14.

Referring again to the drawings it will be seen that in all cases the divisions of the intermittent rim of the brake shoe, at some point, rest upon and are supported by a surface of the mold as at 80, 80, etc., (Figs. 15 and 16) so that they are not readily displaced by the high pressure incident to molding the lining thereto, as they would be if they extended unsupported into the middle of the mold space 70. While a brake shoe having an intermittent rim as hereinbefore described may be made with a minimum amount of sheet stock such as steel, there is a further advantage to the intermittent rim not previously pointed out, namely, that it does not oppose the shrinkage which must necessarily take place in the lining material after it is pressed into place and while it is being cured, to the same extent as a continuous rim, thereby lessening the danger of shrinkage cracks in the completed lining.

While certain illustrative shoe forms, and a preferred form of mold, are herein illustrated, and one method of manufacture has been described, it is not my intention to limit the scope of the invention by that description, or otherwise than by the terms of the appended claims.

I claim:

1. The method of making a brake shoe which comprises cutting a semi-circular blank from sheet metal, dividing it at one edge by slits extending part way across the blank, bending successive divisions oppositely, and forming a non-metallic brake lining in situ through and about the divisions.

2. The method of making a brake shoe which comprises cutting a semi-circular blank from sheet metal, dividing it at one edge by slits extending part way across the blank, bending successive divisions oppositely forming channels in the divisions and molding a brake lining in situ about and between the divisions.

3. The method of making a brake shoe which comprises forming a web having an intermittent rim and embedding the rim in lining material.

4. The method of making a brake shoe which comprises forming a web having an intermittent rim, deforming the rim to provide channels transversely disposed to the web and embedding the rim in a non-metallic brake lining material.

5. The method of making a brake shoe which comprises forming a web with an intermittent rim, deforming the rim and embedding the rim in a non-metallic brake lining material.

6. The method of making a brake shoe which comprises forming a semi-circular web having a semi-cylindrical rim composed of intermittent portions extending from the web in opposite directions, and forming a brake lining on the rim, consisting of fibrous compound.

7. The method of making a brake shoe which comprises cutting a semi-circular web to produce radial sections, bending the sections in opposite directions to form an intermittent rim, and molding a non-metallic brake lining in situ about the intermittent rim.

8. The method of making a brake shoe which comprises cutting a semi-circular metal web to produce radial sections, stamping channels in the sections, bending the sections in opposite directions to form an intermittent rim, and molding a brake lining in situ about the sections.

VINCENT G. APPLE.